United States Patent
Polyanchik et al.

(10) Patent No.: US 6,321,528 B1
(45) Date of Patent: Nov. 27, 2001

(54) TURBINE, FOR A LIQUID-PROPELLANT ROCKET ENGINE MAINLY

(75) Inventors: Nadezhda Konstantinovna Polyanchik; Mikhail Ivanovich Prozhiga, both of Moskovskaya oblast (RU)

(73) Assignee: Otkrytoe Aktsionernoe Obschestvo "Nauchno-Proizvodstvennoe Obiedinenie "Energomash" Imeni Akademika V.P. Glushko" (RU)

( * ) Notice: Subject to any disclaimer, the term of this patent is extended or adjusted under 35 U.S.C. 154(b) by 0 days.

(21) Appl. No.: 09/392,958

(22) Filed: Sep. 9, 1999

(30) Foreign Application Priority Data

Feb. 23, 1999 (RU) ................................................ 99103552

(51) Int. Cl.$^7$ .................................................... F02K 9/42
(52) U.S. Cl. ............................................. 60/259; 415/116
(58) Field of Search ...................... 60/259, 267; 415/116, 415/117

(56) References Cited

U.S. PATENT DOCUMENTS

| | | |
|---|---|---|
| 3,883,263 | 5/1975 | Mai . |
| 3,943,706 * | 3/1976 | Grafwallner et al. .................. 60/204 |
| 4,073,138 * | 2/1978 | Beichel .................................. 60/259 |
| 5,953,900 * | 9/1999 | Bannister et al. ................... 60/39.05 |

FOREIGN PATENT DOCUMENTS

| | | |
|---|---|---|
| 1188337 | 10/1985 | (SU) . |
| 1537840 | 1/1990 | (SU) . |

* cited by examiner

*Primary Examiner*—Charles G. Freay
(74) *Attorney, Agent, or Firm*—Blakely Sokoloff Taylor & Zafman

(57) ABSTRACT

The invention relates to the field of power machine building and concerns the improvements in turbines for liquid-propellant rocket engines. A turbine includes a casing enclosing a working chamber and a propellant feed passage communicating with the working chamber. A cooling space, and a cooling fluid feed passage also communicate with the cooling space. The turbine also has a turbine wheel to be cooled by a cooling fluid. An annular chamber communicating with an annular slot can allow the cooling fluid to cool the turbine wheel. Also provided is a bush of material having the thermal conductivity higher than that of the casing material, located coaxially to the turbine wheel. The bush is made to have a length longer than that of the turbine wheel. The bush is mounted so that to bulge out of the turbine wheel towards the propellant feed channel. Surfaces of the annular chamber and the annular slot are formed by a surface of the bulging out part of the bush.

4 Claims, 2 Drawing Sheets

TURBINE, FOR A LIQUID-PROPELLANT ROCKET ENGINE MAINLY

FIELD OF THE INVENTION

The invention relates to the field of power machine-building and may be used in turbines designed for liquid-propellant rocket engines (LRE).

BACKGROUND OF THE INVENTION

A turbine comprising a casing with a working chamber, a propellant feed passage and a cooling space communicating with cooling fluid feed passages, a turbine-wheel with a shroud located inside the working chamber, and an annular cooling space with cooling fluid feed passages, both located inside the casing, is known in the prior art (SU Inventor's Certificate, No. 1188337, Int. Cl F01D 11/10, 1985).

Disclosed in SU Inventor's Certificate No. 1537840 (Int. Cl. F01D 5/08, 1990) is another turbine comprising a casing provided with a cooling fluid feed passage communicating with an annular space used to feed a cooling fluid onto a turbine wheel.

A problem with the above turbines is the possibility of ignition when operating with active oxidizing gaseous fluids.

Still another conventional turbine comprises a casing with a working chamber, a propellant feed passage and a cooling space communicating with cooling fluid feed passages, a turbine wheel located in the working chamber and means for feeding a cooling fluid onto the turbine wheel, said means for feeding a cooling fluid being located in the end part of the working chamber on the side of the propellant feed passage and made as an annular chamber communicating with annular slots (U.S. Pat. No. 3,883,263, U.S. Cl. 415–116, 1975).

The above turbine is designed for transport engines However, in this case it is difficult to ensure the reliable operation of the turbine from the point of view of the ignition danger while using the widely-used materials when a high-temperature oxidizing fluid is used as a propellant, as takes place in some modern high-power LRE.

SUMMARY OF THE INVENTION

It is an object of the invention to prevent emergency situations and improve the operation reliability in a turbine in which a high-temperature oxidizing gas is used as a propellant.

The improved reliability is to be provided by means of preventing the ignition in the inner space of the turbine at the operation on an oxidizing gas, thereby increasing turbine lifetime.

The above object is achieved in a conventional turbine comprising a casing enclosing a working chamber, a propellant feed passage communicating with the working chamber, a cooling space, and a cooling fluid feed passage communicating with the cooling space, a turbine wheel located in the working chamber, means for feeding a cooling fluid onto the turbine wheel, said means being located in an end part of the working chamber on the side of the propellant feed passage and made as an annular chamber communicating with an annular slot provided in the casing and communicating with the cooling fluid feed passage, wherein in accordance with the invention the turbine wheel comprises a shroud, a bush made of a material, the thermal conductivity of which is higher than that of a material of the casing, is located coaxially to the turbine wheel, the bush being fastened in the casing to define a cooling space located above an outer surface of the bush, and having a length longer than that of the turbine wheel, the bush being mounted so that to bulge out of the turbine wheel towards the propellant feed passage, outer surfaces of the annular chamber and the annular slot of the means for feeding the cooling fluid onto the turbine-wheel being formed by an inner surface of the bulging out part of the bush.

Further embodiments of the invention are possible, in which it is advisable that the turbine further included a spacer made of a material with a higher thermal conductivity than that of the casing material, and mounted in the casing on the side of the propellant feed passage, an inner surface of the annular slot in the means for feeding a cooling fluid onto the turbine wheel can be formed by an outer surface of the spacer, and the bush can be made to consist of two parts located in the casing and made of bronze.

BRIEF DESCRIPTION OF THE DRAWINGS

The advantages and distinctive features of the invention will appear more clearly from the description of its best embodiment, with the reference to the accompanying drawings, in which.

DESCRIPTION OF THE PREFERRED EMBODIMENT

Figure 1:
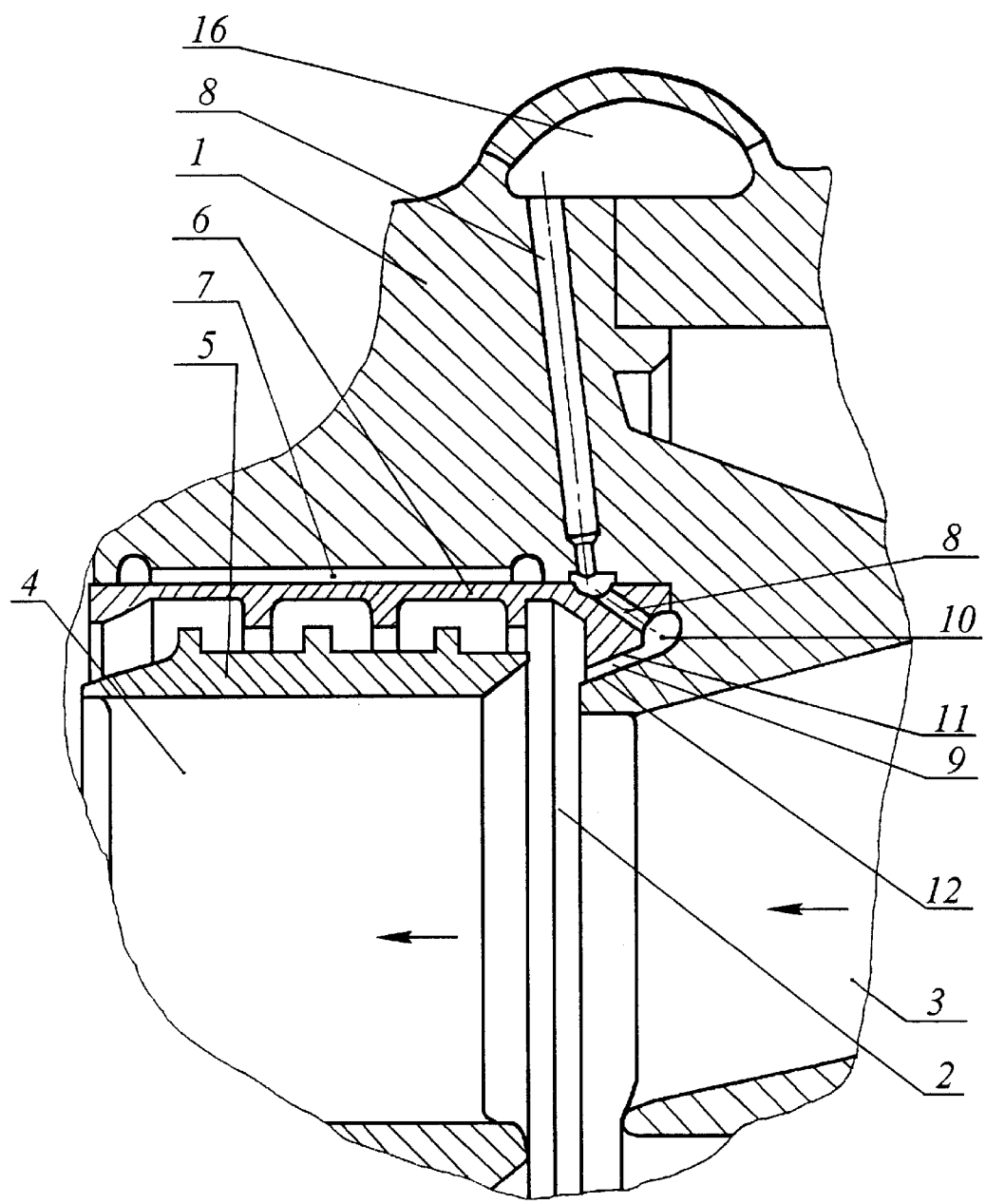
FIG. 1 is a longitudinal (relative to the propellant feed passage) sectional view of a turbine in accordance with the invention.
Figure 2:
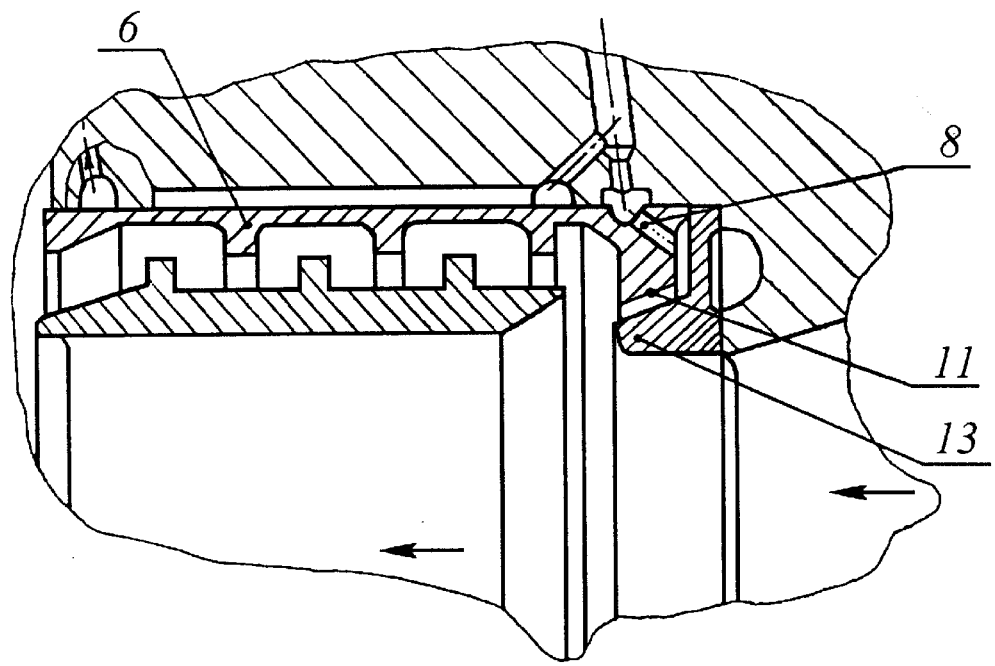
FIG. 2 is the same view as presented in FIG. 1, but for the case of forming the annular slot outer surface by a spacer.

Referring to FIG. 1, a turbine for a liquid-propellant. rocket engine comprises a casing 1 with a working chamber 2 and a propellant feed passage 3, a turbine wheel 4 with a shroud 5, located in the working chamber 2, and a bush 6 located coaxially to the turbine wheel 4 and fastened in the casing 1 to define a cooling space 7 communicating with cooling fluid feed passages 8. The passages 8 are shown in FIG. 2 by separate cutouts in the casing 1. Means for feeding a cooling fluid onto the turbine wheel 4 is located in the end part of the working chamber 2 on the side of the propellant feed passage 3, the means being made as an annular chamber 10 communicating with an annular slot 9 made in the casing 1 and connected to the cooling fluid feed passages 8/

The annular slot 9 is defined by surfaces 11 and 12 of the bush 6 and the casing 1, respectively, the surfaces being concentric and mating with a guaranteed gap. The mating surfaces 11 and 12 of the bush 6 and the casing 1 may be made to be cylinder, tapered or curvilinear.

The bush 6 is made of a material, the thermal conductivity of which is higher than that of the casing 1 material. The bush 6 is fastened inside the casing 1 so that to form a cooling space 7 above an outer surface of the bush. The bush 6 is made to have a length longer than a length of the turbine wheel 4 along the longitudinal axis, and is mounted so that to bulge out of the turbine wheel towards the propellant feed passage 3. Outer surfaces of the annular chamber 10 and the annular slot 9 of the means for feeding the cooling fluid onto the turbine wheel are formed by an inner surface of the bulging out part of the bush 6.

Referring to FIG. 2, a turbine further comprises a spacer 13 of a material having a higher thermal conductivity than that of the casing 1 material. The spacer 13 is mounted in the casing 1 on the side of the propellant feed passage 3. In this embodiment, an inner surface of the annular slot 9 of the means for feeding a cooling fluid onto the turbine wheel is formed by the outer surface of the spacer 13.

Figure 3:
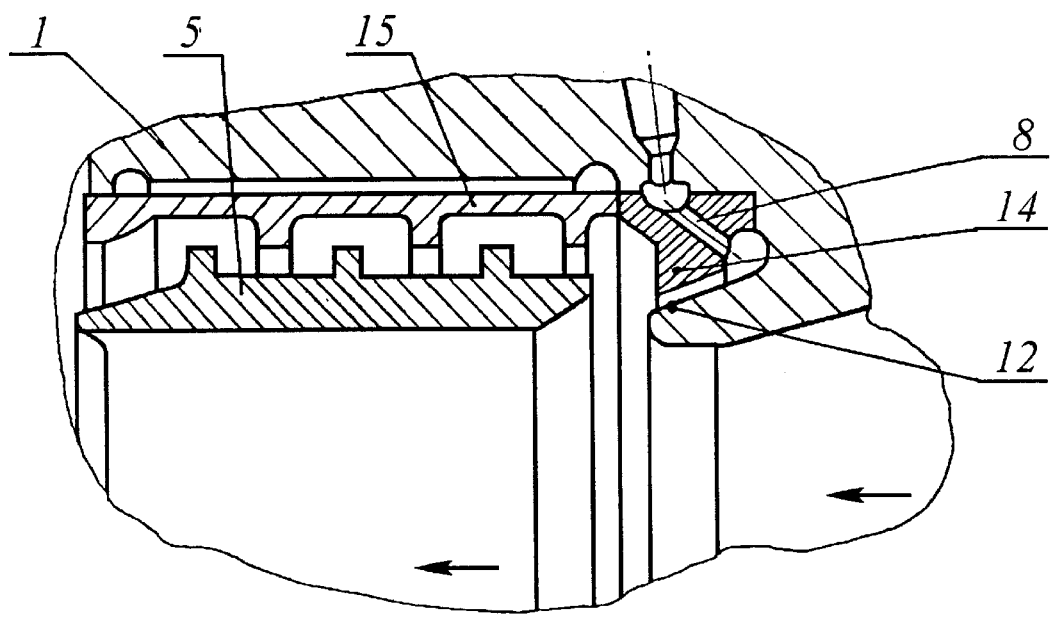
FIG. 3 is the same view as presented in FIG. 1, but for the case of making the bush to consist of two parts.

FIG. 3 shows a turbine having a composite bush consisting of two parts 14 and 15 located in the casing 1.

In the above turbine comprising a space 16 for feeding a cooling fluid, the use can be made of a liquid oxidizer as the cooling fluid.

During the turbine operation, a liquid oxidizer is fed into the annular chamber 10 from the space 16 through the passages 8, and is injected into the working space 2 through the annular slot 9 Simultaneously, the liquid. oxidizer (e.g. oxygen) is fed into the cooling space 7 from the space 16 through the passages 8, to cool the bush 6. Owing to the presence of the annular slot 9, the coolant is continuously fed over the entire turbine wheel 4 diameter into the region of axial gap between the rotary shroud and stationary parts of the casing 1. This improves the effectiveness of cooling the turbine wheel 4 and prevents the possibility for the ignition of the structure materials in the working chamber 2.

The turbine of a liquid-propellant rocket engine in accordance with the invention may be most successfully used in power machine building, in engines operating on active oxidizing gaseous fluid.

We claim:

1. A turbine comprising:

a casing enclosing a working chamber, a propellant feed passage communicating with the working chamber, a cooling space, a cooling fluid feed passage communicating with the cooling space, an annular chamber, and an annular slot communicating with said annular chamber;

a turbine wheel located in the working chamber and provided with a shroud, said annular chamber and said annular slot to feed a cooling fluid onto the turbine wheel;

a bush of a higher conductivity than that of a material of the casing, the bush being fastened in the casing and adjacent said cooling space, a length of the bush being longer than that of the turbine wheel, the bush to bulge towards the propellant feed passage, surfaces of the annular chamber and of the annular slot being formed by a surface of the bush.

2. A turbine as set forth in claim 1, further comprising a spacer of a material with a higher thermal conductivity than that of the casing material, said spacer mounted inside the casing adjacent the propellant feed passage, wherein a surface of the annular slot is formed by a surface of the spacer.

3. A turbine as set forth in claim 1, wherein said bush is made of two parts located in the casing.

4. A turbine as set forth in claim 1, wherein said bush is made of bronze.

* * * * *